United States Patent [19]
Frid-Nielsen

[11] Patent Number: 5,655,093
[45] Date of Patent: Aug. 5, 1997

[54] INTELLIGENT SCREEN CURSOR

[75] Inventor: Lars Frid-Nielsen, Santa Cruz, Calif.

[73] Assignee: Borland International, Inc., Scotts Valley, Calif.

[21] Appl. No.: 751,457

[22] Filed: Nov. 18, 1996

Related U.S. Application Data

[63] Continuation of Ser. No. 847,504, Mar. 6, 1992, abandoned.

[51] Int. Cl.$^6$ .................................................. G06F 3/00
[52] U.S. Cl. ............................................ 395/326; 395/334
[58] Field of Search .................................... 395/326, 334, 395/336, 333, 337; 345/156, 167

[56] References Cited

U.S. PATENT DOCUMENTS

| | | | |
|---|---|---|---|
| 4,622,013 | 11/1986 | Cerchio | 434/118 X |
| 4,789,962 | 12/1988 | Berry | 395/155 X |
| 4,964,077 | 10/1990 | Eisen | 364/419.1 |
| 5,123,087 | 6/1992 | Newell | 395/155 X |
| 5,235,679 | 8/1993 | Yoshizawa et al. | 395/161 X |

OTHER PUBLICATIONS

Mastering WordPerfect 5.1 × 5.2 for Windows (Trademark of Sybex Inc.), 1992, pp. 6–8, 69–70, 646–649, 659 × 665–666.

Wordperfect 5.1 for Windows by Example (Trademark of Tony Webster & Associates), 1992, pp. 1, 3, 9, 381, 385 & 551–554.

Matthies, Kurt W.G., *Balloon Help Takes Off*, MacUser, Dec. 1991, pp. 241–248.

*Primary Examiner*—Phu K. Nguyen
*Assistant Examiner*—Cliff N. Vo
*Attorney, Agent, or Firm*—John A. Smart

[57] ABSTRACT

A system for assisting a user of a computer system in entering valid information includes a computer having a processor and a memory, a display device for illustrating screen objects, a screen cursor for indicating a location on the display device, an input device for positioning the screen cursor, and screen information for indicating user operations available with the input device.

1 Claim, 14 Drawing Sheets

INTELLIGENT SCREEN CURSOR

This is a File Wrapper Continuation Patent application of application Ser. No. 07/847,504, filed Mar. 6, 1992, now abandoned.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computer systems and, more particularly, to systems and techniques for receiving information from and conveying information to a user of a computer system.

With the advent of the personal computer, the use of computer systems is becoming increasingly prevalent in everyday life. In the past, computers were often housed in highly restricted areas, with access limited to a few computer scientists and programmers. Today, however, computers can be seen on the desktops of most business professionals. Running software applications such as word processors and spreadsheets, for example, even the average business professional can realize substantial productivity gains. Besides the business environment, computers can also be found in wide use both at home and at school.

Also in contrast to the past, the average computer user of today is usually not a computer scientist. Instead, he or she will typically have little or no formal training in the computer sciences or even in the basic use of a personal computer. Nevertheless, these untrained workers often must be proficient in the use of computers in order to compete effectively in the job market. An applicant for a legal secretary position today, for example, is expected to be proficient in the use of wordprocessing software, such as WordPerfect™. As a result, there have been much interest in providing computers which are easier to use.

To increase ease of use, designers of computer systems have labored for decades to create architectures which are intuitive. Most of this effort has been centered around the user interface or UI—the means by which a user communicates (i.e., supplies input and receives output) with a computer. Not surprisingly, the quality of a user interface depends to an extent on the technology in the underlying hardware.

Early advances in user interface design came in the form of "interactive" computer systems. Unlike "batchprocessing" systems, these computers allowed users to interact in real-time, often printing the desired results moments after the user had keyed in an appropriate command. Employing teletype (TTY) terminals, however, these early command-line systems were interactive only to the extent of receiving or printing one line of text at a time.

As TTY interfaces gave way to video display terminals (VDTs), it became possible for a user to input and receive information anywhere on a screen. Typically employing special keystrokes, these character-based VDTs allowed a user to move a cursor across the screen. Thus, a user could "go back" (reposition the cursor) and correct mistakes and/or otherwise update information.

Exemplified by Microsoft's DOS A> prompt, these systems were still rather limited in their ability to receive user input, however. A typical system, for example, could only process one user-typed command at a time. In an effort to keep the number of keystrokes required for a command to a manageable level, these command-line interfaces tended to employ short commands; however, these commands were often cryptic as well. Thus while VDTs provided increased flexibility, these "command-line" interfaces were still far from intuitive for the average user.

With increasingly widespread availability of powerful microprocessors, graphical user interfaces (GUIs, pronounces "gooeys") have become feasible. A GUI is a type of display format that enables a user to operate a computer by pointing to pictorial representations, such as "icons" (bitmaps) and "pull down" menus, displayed on a screen device. Choices are generally selected by the user with a keyboard and/or pointing device; the latter including such well-known devices as a mouse, track ball, digitizing tablet, and light pen, or the like. Thus, the need for the user to memorize special commands has been lessened by the ability to operate a computer by selecting screen objects.

Well-known GUIs include Apple's Macintosh (Mac) interface, Microsoft's Windows, IBM's OS/2 Presentation Manager, Sun Microsystem's Open Look, and Open Software Foundation's Motif. Employing one or more windows, a menu bar, and a screen pointer, each of these systems can be readily distinguished from almost any non-GUI system.

The screen cursor or pointer, typically displayed as a small arrow icon (bitmap), allows the user to select individual points on the screen. In operation, the screen cursor moves to a desired screen location in response to movements of a pointing device (e.g., mouse) by the user. Besides movement, most pointing devices include one or more switches or "mouse buttons" for specifying additional user input or "user events." For example, a user may select a screen point by "clicking" (depressing and releasing) a mouse button once while the cursor is positioned at the desired point. By double-clicking (two mouse clicks in rapid succession) a user may select an item and start an action. By "dragging" (continually depressing a mouse button) the user may move objects on the screen or select groups of objects. Thus, objects can be picked up, moved, and directly manipulated with a versatility that is not possible with a keyboard alone. Moveover, pointing is a very natural, human action which, unlike a keyboard, does not require any special training to master.

The menu bar runs across the top of the screen and serves to group or categorize commands available to the user. Clicking on an item on the menu bar typically causes a "pull-down" menu to appear. This second or "submenu" also includes a number of items, each of which is associated with a desired action, including the display of even more menus. To select a desired action, the user usually clicks the corresponding menu item with the screen or mouse pointer. For some menu items, particularly those which may be nested in several layers deep, a keyboard equivalent or "hot key" may be available but. Unfortunately, these must also be memorized by the user.

A window is a rectangle displayed on the screen that allows a user to work within a program. In typical operation, the user may move the window about on the screen, change its size or shape, enlarge it to fill the screen, close it entirely, or change how much of its contents are displayed. To aid the user in the manipulation of its contents, a window will typically include a number of user interface components, such as buttons, menus, sliders, and the like. Outside the window, the screen can display other screen objects, such as other windows, disk drive icons, or even a trash can icon.

Another advantage attendant to a GUI environment is consistency of operation between application software. For example, a task common to more than one application (e.g., saving a data file) is generally performed in the same manner regardless of the particular application (e.g., spreadsheet, wordprocessor, and the like) currently operating. To foster this consistency, most GUI vendors publish style guides setting forth interface guidelines for application developers. IBM's *System Application Architecture, Common-User Access: Advanced Interface Design Guide* (SC26-4582-0) and Microsoft's Windows style guides are two such examples.

Despite efforts to present a consistent interface, however, most application software still requires complex user actions, such as triple-clicking or dragging a mouse device while a key is held down. Thus, there typically exists a plethora of ways to do almost anything in a graphical interface, such as the Mac. While this increases the flexibility of a system, it also adds to the complexity of the interface that the user must master. And this problem is by no means limited just to novice users. Experienced computer users are reluctant to read user manuals and, hence, often fair no better than novice users.

The problem of interface complexity is even worse between GUIs from different vendors. In that case, there is usually no common style guide to which the multi-platform application developer can turn. Moreover, competing GUIs will often be purposely inconsistent, presumably for marketing and/or legal reasons. All told, the user is still required to memorize special commands.

The present invention recognizes that it is highly desirable to provide computers with system and application software which is highly intuitive to users, including those who are untrained in the use of the software. What is needed is a system and interface methods which require little or no knowledge of specific commands by the user. More particularly, the system should automatically and explicitly indicate to the user the appropriate action he or she may take. The present invention fulfills this and other needs.

SUMMARY OF THE INVENTION

A system of the present invention for assisting the user in entering valid information includes a computer having a processor and a memory, a display device for illustrating screen objects, a screen cursor for indicating a location on the display device, an input device for positioning the screen cursor, and displayed screen information for indicating user operations available with the input device. In a preferred embodiment, the system includes an intelligent screen cursor providing both screen location information as well as information about which user input(s), if any, are valid in a given context of the system.

A method of the present invention for assisting a user of a computer system having an input device includes determining valid user signals which are available for the input device in the current context of the system, displaying screen information indicating operation(s) of the input device which correspond to the determined valid user signals, and continually updating the screen information for different screen locations or contexts of the computer system. In a preferred method of the present invention, the valid signals or user inputs which may be entered with a pointing device are indicated to the user by a screen cursor bitmap, which illustrates how the signals are generated. For a two-button mouse device, for example, the bitmap cursor may display a mouse device icon showing which button(s) should be depressed.

DETAILED DESCRIPTION OF A PREFERRED EMBODIMENT

Figure 1A:
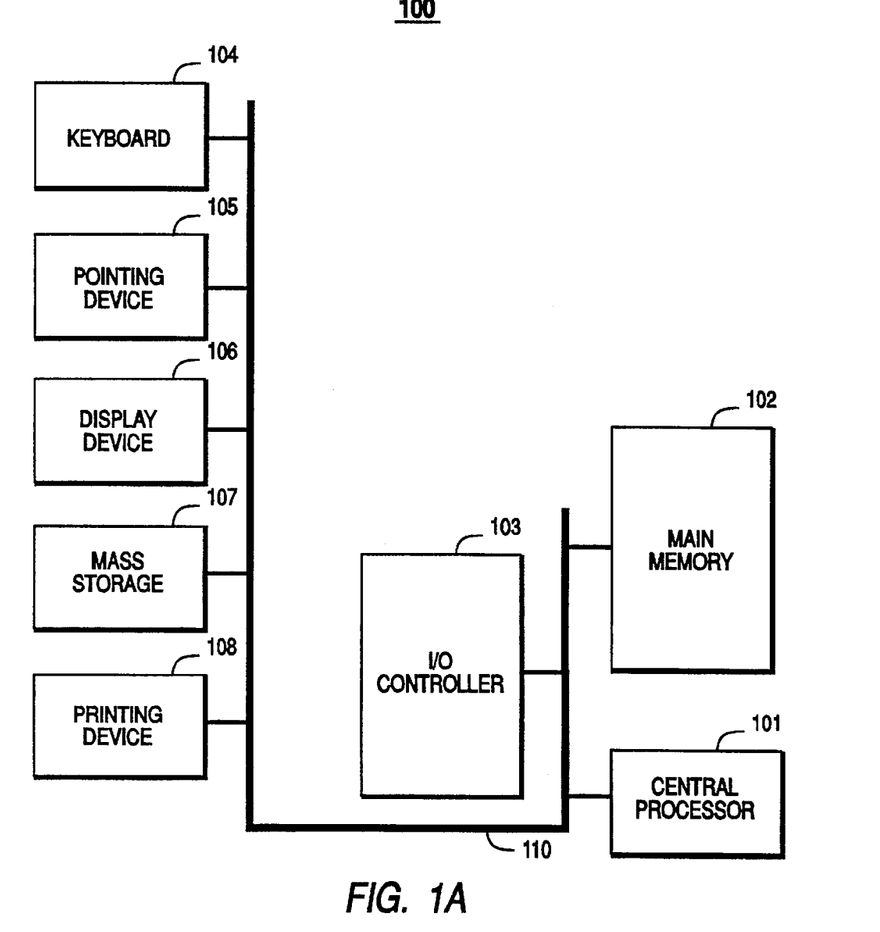
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As shown, the various components of the system 100 communicate through a system bus 110 or similar architecture.

Figure 1B:
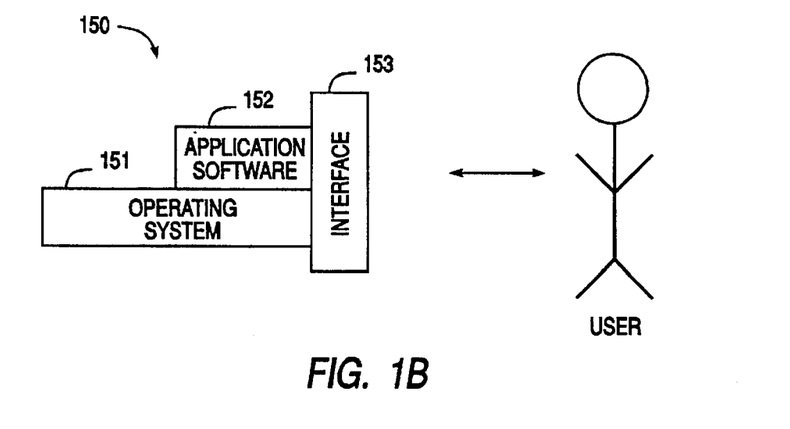
FIG. 1B a block diagram of a software system of the present invention, which may include operating system, application software, and user interface components.

Illustrated in FIG. 1B, a computer software system 150 is provided for programming the operation of the computer system 100. Software system 150, which is stored in system memory 102 and on disk memory 107, includes an kernel or operating system 151 and a shell or interface 153. One or more application programs, such as application software 152, may be "loaded" (i.e., transferred from storage 107 into memory 102) for execution by the system 100. Under the command of software 151 and/or application software 152, the system 100 receives user commands and data through user interface 153. The interface 153 also serves to display results, whereupon the user may supply additional inputs or terminate the session.

In a preferred embodiment, the system 100 is an IBM-compatible personal computer, available from a variety of vendors (including IBM of Armonk, N.Y.). Operating system 151 is MS-DOS and interface 153 is Microsoft Windows, both of which are available from Microsoft Corporation of Redmond, Wash. Application software 152 can be any one of a variety of software applications, including word processing, database, spreadsheet, CAD applications, and the like. Alternatively, the system 100 may be implemented in other platforms, including Macintosh, Unix, and the like. While the present invention is best implemented in those systems employing computer graphics, those skilled in the art will also appreciate that the present invention may be employed in certain character-based systems, as well.

INTRODUCTION

The following description will focus on the Microsoft Windows environment, which is currently one of the most popular GUI interfaces. The present invention, however, is not limited to any particular interface but, instead, may be advantageously applied to any environment which allows user input by means of a screen cursor. Therefore, the description of the windowing environment which follows is for purposes of illustration and not limitation.

Figure 2A:
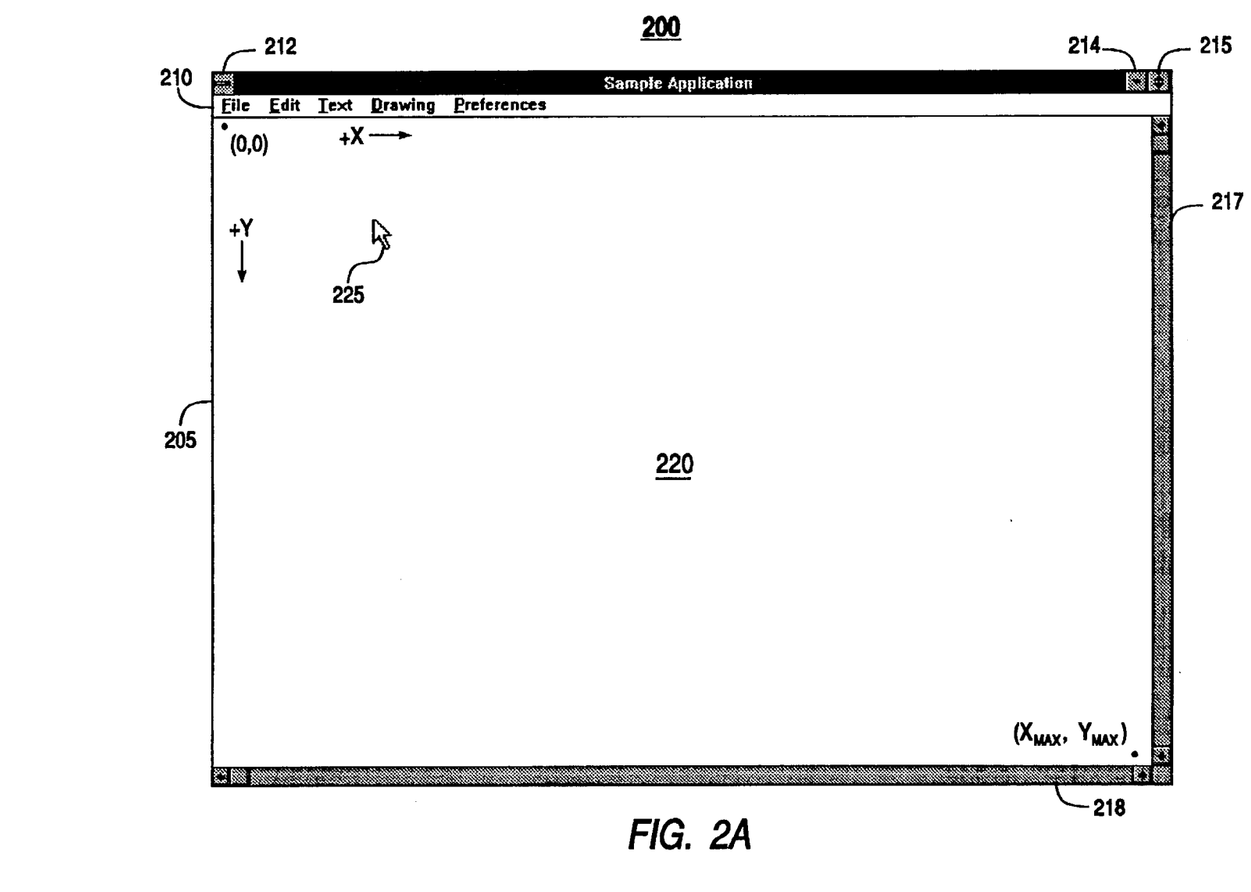
FIG. 2A bitmap screen shots illustrating the basic architecture and functionality of a graphical user interface, including the operation of a screen (mouse) cursor or pointer.

As shown in FIG. 2A, most all GUIs are based on a graphical window metaphor. Window 200, which is displayed on the screen 106, is a rectangular, graphical user interface for viewing and manipulating graphic images. Window 200 contains a menu bar 210 having a plurality of choices, each of which may invoke additional submenus and software tools for use on screen images. Window 200 includes a client area 220 for displaying images, such as graphics or text objects. In essence, this is a workspace or viewport for the user to interact with data objects which reside within the computer system 100. Regions outside of the area 220, on the other hand, are commonly referred to as "non-client" areas.

Important to the successful implementation of any GUI is the ability of the user to access individual points in a window. Objects within the window 200 may be accessed as follows. The client area of each window is treated as a separate drawing surface comprised of a two-dimensional array of picture elements or "pixels." Default drawing coordinates are provided so that the origin (0,0) is in the upper-left corner of the windows client area, with corresponding maximum coordinates at the lower right hand corner. Each pixel may be individually addressed by application and/or system software, thereby permitting the display and access of any desired graphic image. Thus instead of entering a series of complex or cryptic commands, the user may simply point at a screen object and then indicate the action desired.

To achieve this "point-and-shoot" functionality, practically all GUIs provide a screen cursor or pointer, such as the screen cursor 225. Screen cursor 225 is an icon or small bitmap image or mask, commonly in the form of a slanted arrow, which appears to float (i.e., freely move) across a screen in response to user input signals (e.g., from the pointing device 105). The screen cursor includes a "hot spot" (e.g., the tip of the arrow) for indicating an exact position. Since the most popular pointing device employed is a mouse device, the screen cursor 225 is often referred to as a "mouse cursor." Single-button, double-button, and triple-button mouse devices which may serve to generate signals for the cursor 225 are available from a variety of vendors including Apple Computers of Cupertino, Calif., Microsoft Corporation of Redmond, Wash., and Logitech Corporation of Fremont, Calif.

Figure 2B:
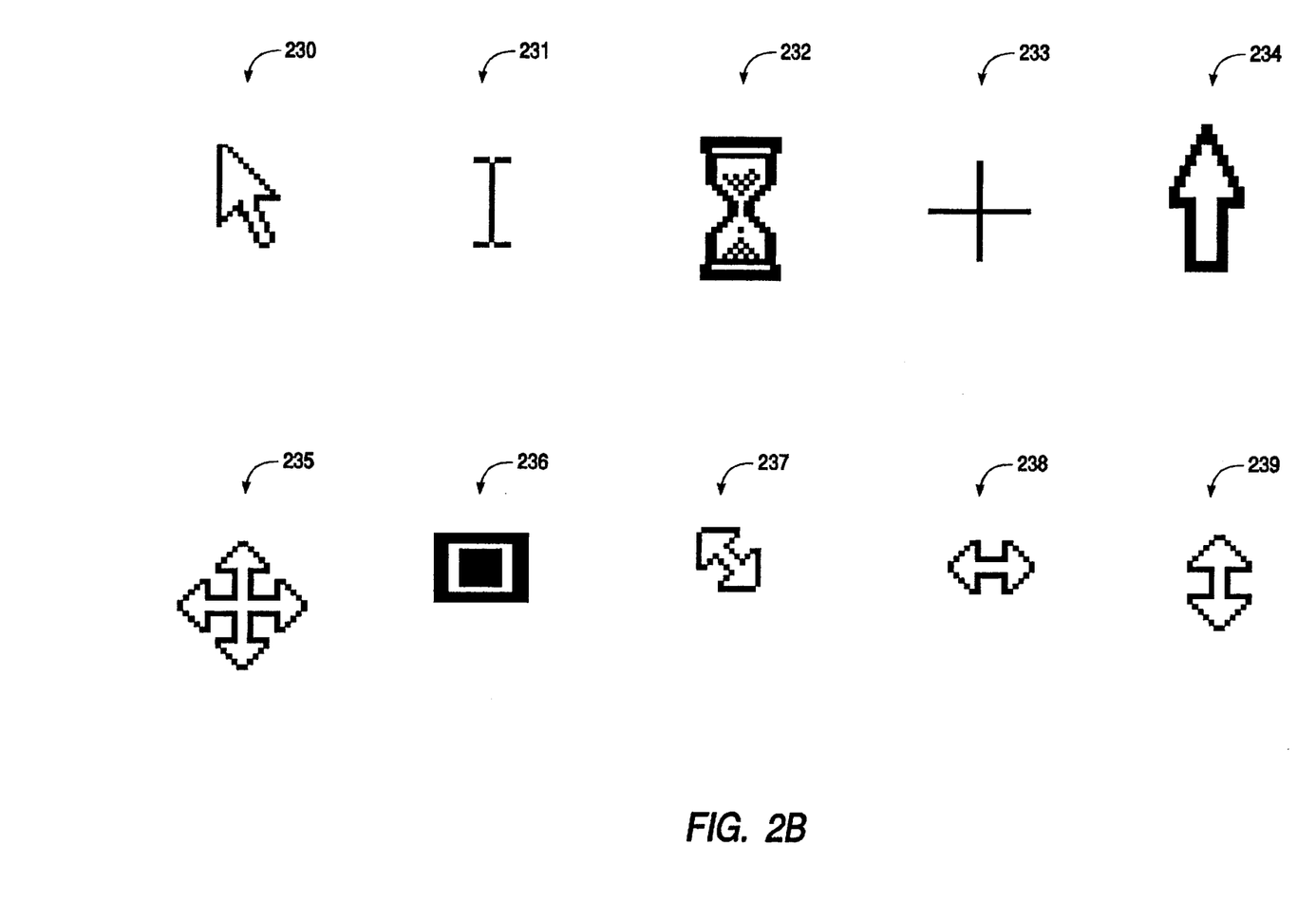
FIG. 2B is a collection of screen cursor icons, which may serve to indicate different modes (e.g., "drawing" mode) of operation.
Figure 2C:
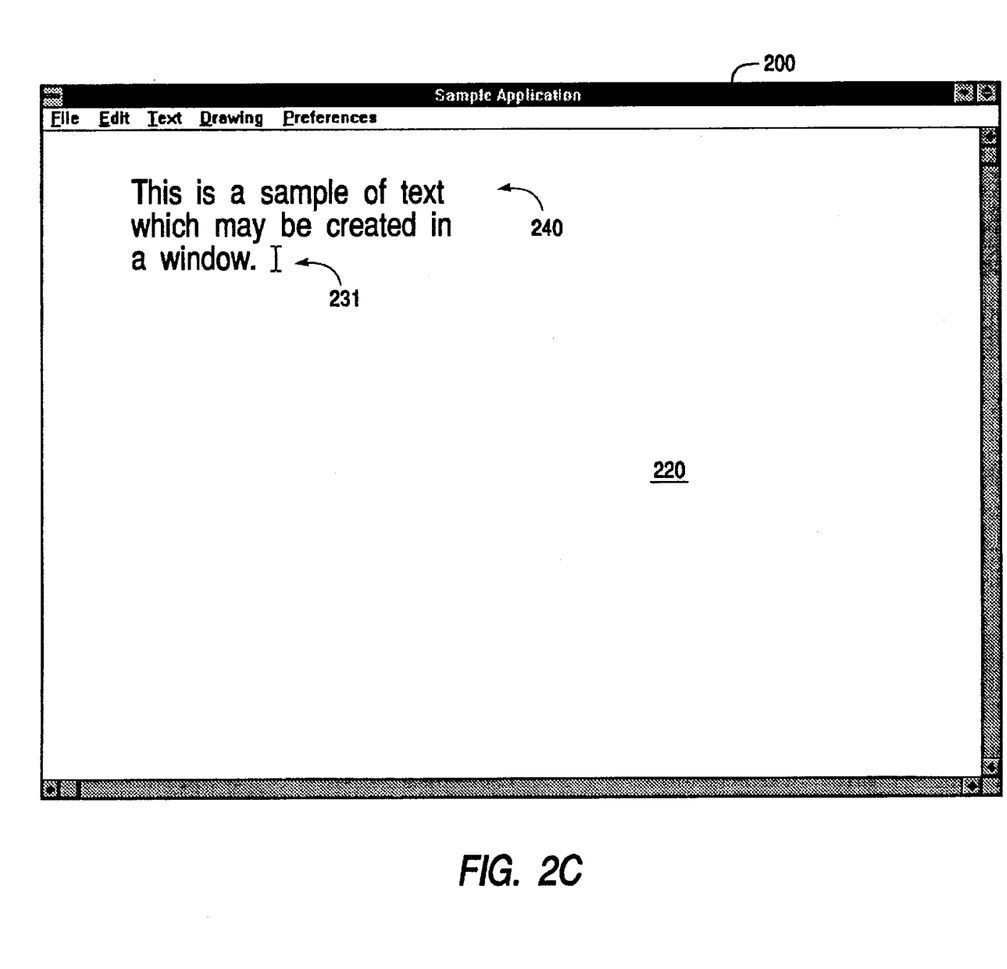
FIGS. 2C–E are bitmap screen shots illustrating the use of different screen cursors to indicate mode of operation.
Figure 2D:
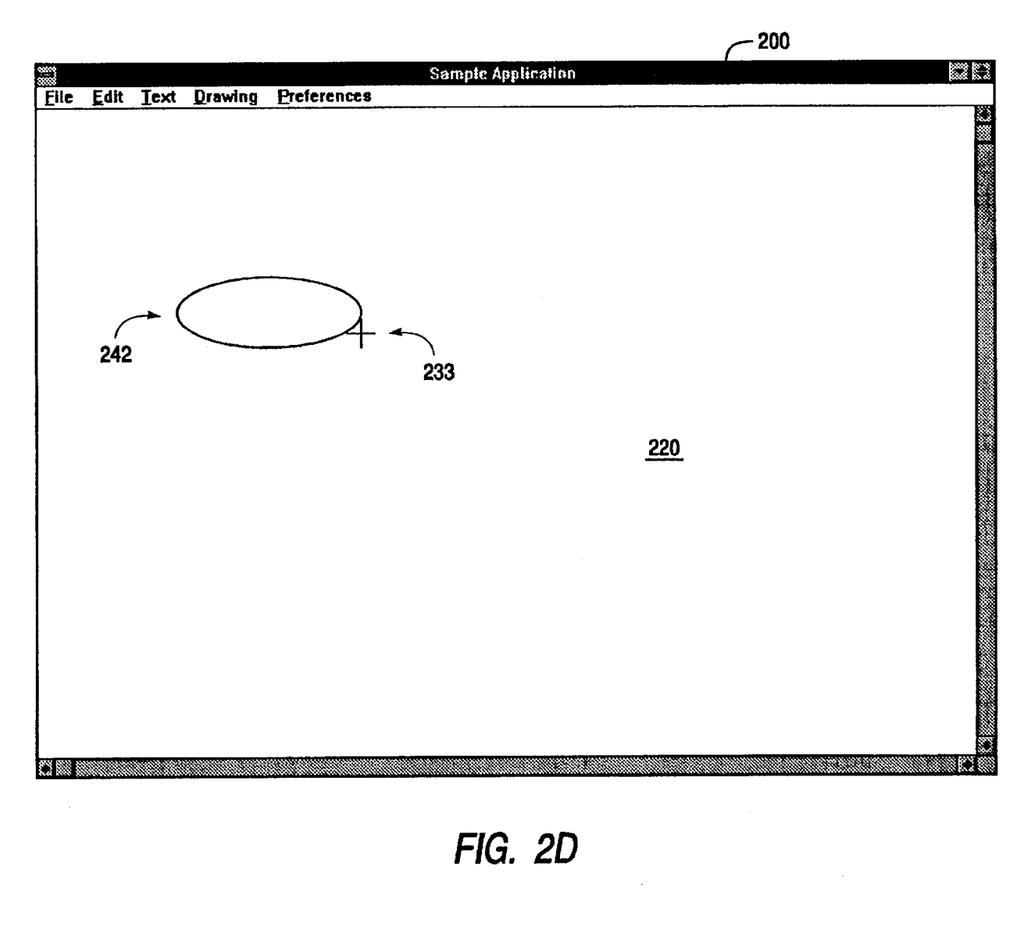
Figure 2E:
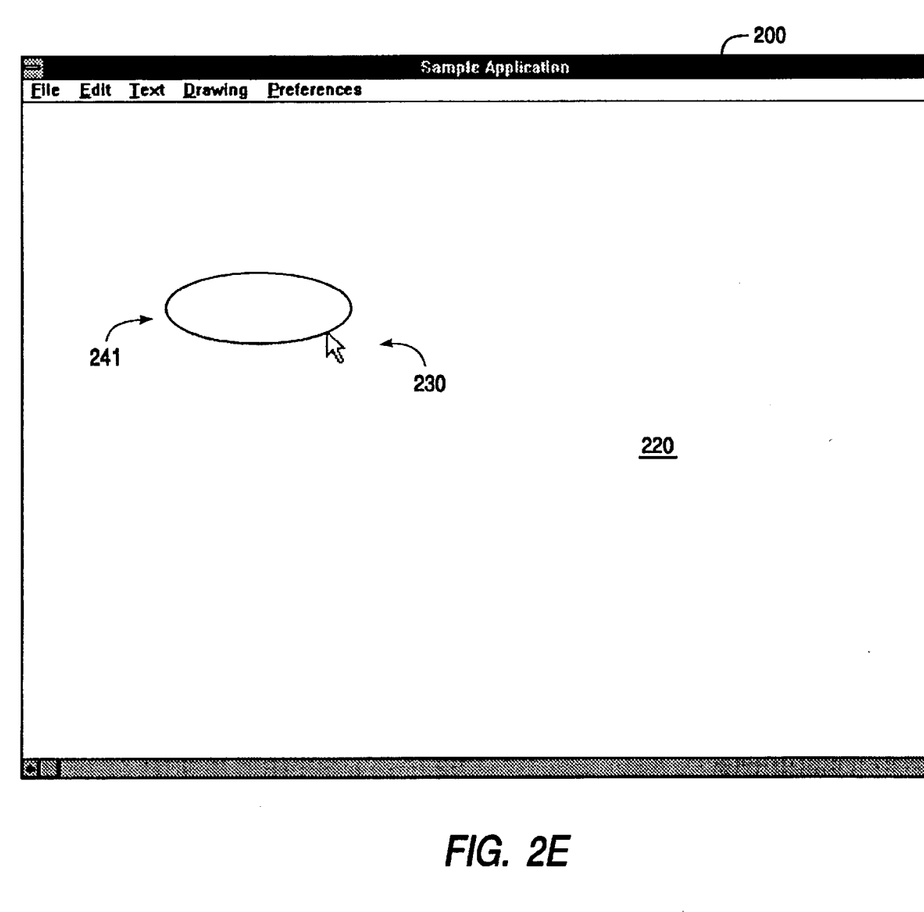

As shown in FIG. 2B, Microsoft Windows includes standard or stock cursors 230–239 for use by application programs. As shown in FIGS. 2C–E, these different cursor bitmaps are employed to indicate different modes of operation. In FIG. 2C, for example, the user has entered a text object 240 in the client area 220 of the window 200. In this example, the mouse pointer is displayed as the I-beam cursor bitmap 231, for indicating the current insertion point for entering text into the client area 220. Thus, the cursor 231 indicates a screen position and a system mode (text entry).

Figure 3A:
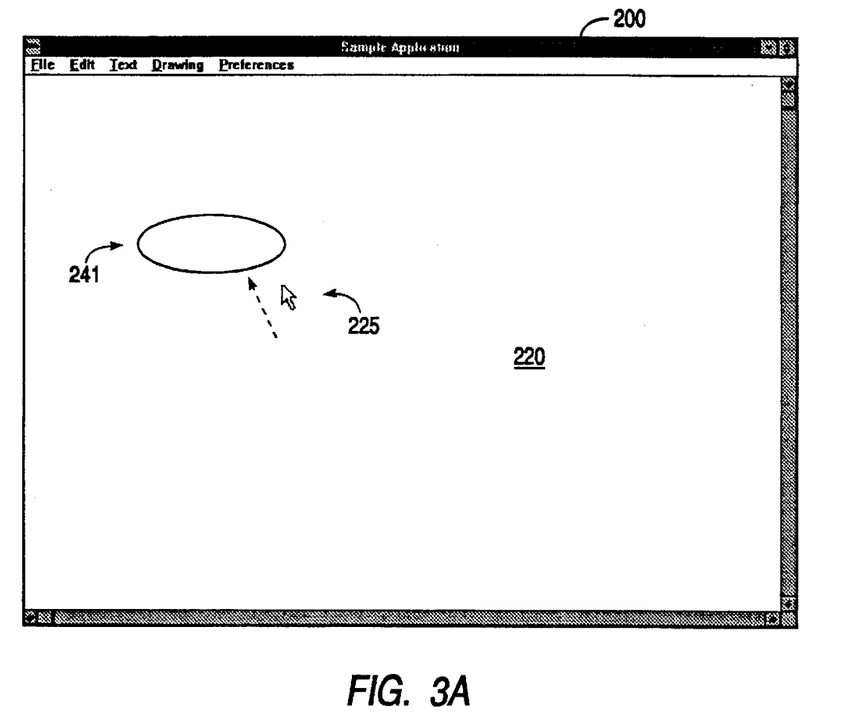
FIGS. 3A–E illustrate the operation of a screen cursor which does not provide immediate feedback of the actual input options available to the user.
Figure 3B:
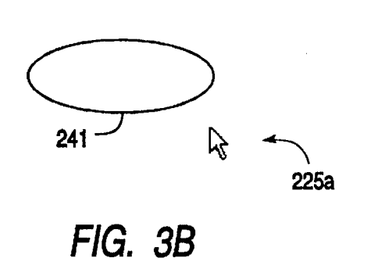
Figure 3C:
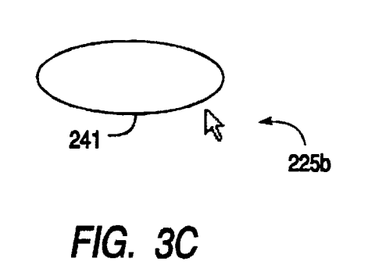
Figure 3D:
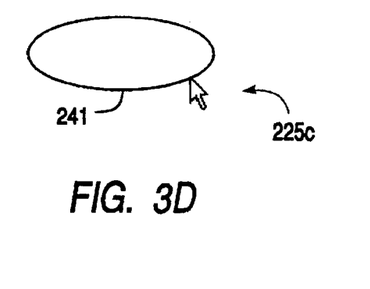
Figure 3E:
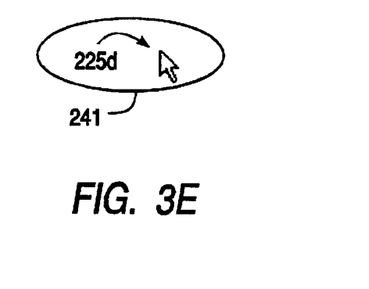

In a similar manner, as shown in FIG. 2D, the screen cursor may be displayed as a crosshair bitmap 233. In this example, the crosshair indicates a screen position and a drawing mode, such as an ellipse drawing mode. Once an object has been drawn, the screen cursor 225 may revert back to the default cursor bitmap 230, as shown in FIG. 2E. The exact function of the default cursor is, however, not self-evident; instead, the user would likely have to refer to a user's manual to discern available input options Refer now to FIGS. 3A–J, various operations of the screen cursor 225 will be illustrated. In FIG. 3A, the client area 220 of the window 200 contains the graphic object (ellipse) 241. The user desires to move the screen cursor 225 towards the ellipse 241 (the general direction of movement being indicated by a dashed arrow). This operation is illustrated specifically in FIGS. 3B–E. From FIG. 3B to FIG. 3C, the screen cursor 225 has moved towards the ellipse 241 (as indicated by the transition from cursor 225a to cursor 225b), for example, in response to the pointing device 105 being moved in an upward and left direction. In FIGS. 3D and 3E, the movement of the screen cursor 225 continues towards the screen object 241. In FIG. 3D, for example, the tip or hot point of the screen cursor 225 is "touching" the object 241 (as indicated by the cursor 225c). In FIG. 3E, movement of the screen cursor 225 has continued such that it is now placed within the object 241 (as indicated by screen cursor 225d).

Throughout the foregoing sequence of operation, the user receives no indication or feedback of what input signals (i.e., mouse clicks) are valid. In FIG. 3D, for example, it may be a valid operation for the user to select the object 241 by left clicking the pointing device 105. In FIG. 3E, for example, it may be a valid operation for the user to double click a left button of the pointing device 105 to invoke a particular operation, such as duplicating the object 241. As shown, however, there is no indication which, if any, of these pointing device operations are available to the user at a given time.

Figure 3F:
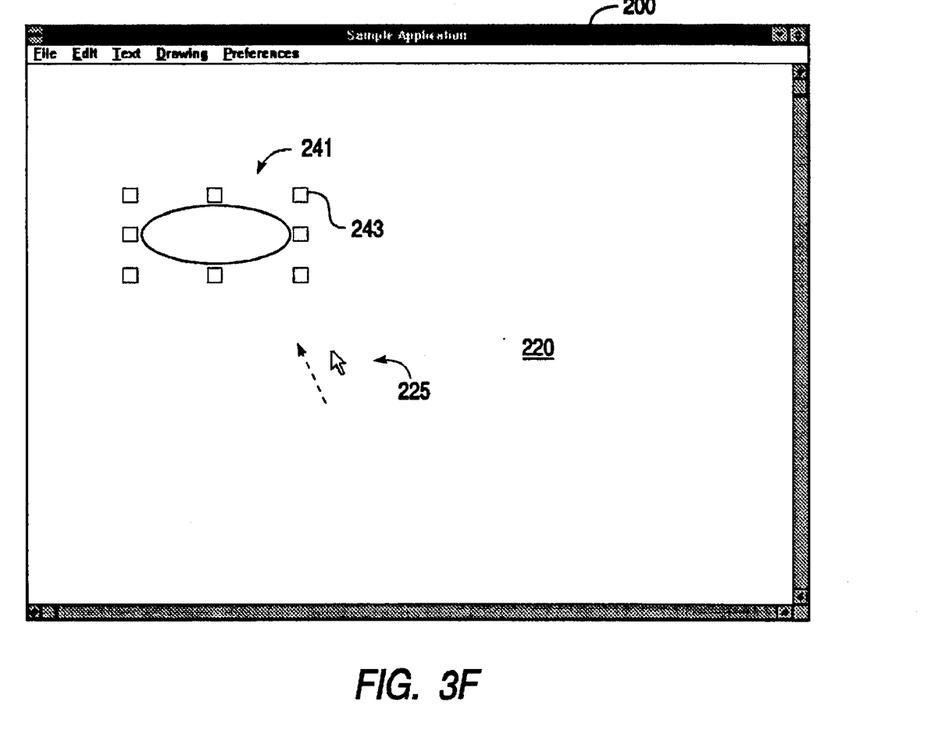
FIGS. 3F–J illustrate the operation of a screen cursor which, unlike the cursor of FIGS. 3A–E, indicates the availability of an additional mode; however, the cursor still does not provide immediate feedback of the actual input options available to the user.
Figure 3G:
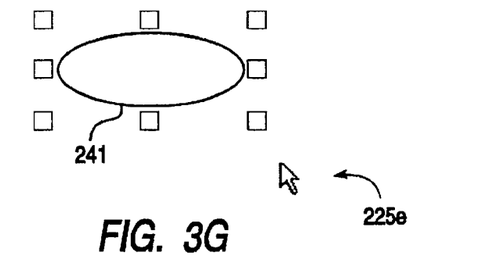
Figure 3H:
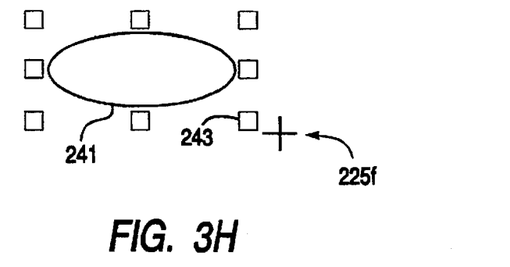
Figure 3I:
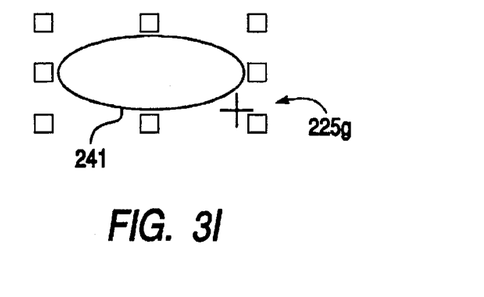
Figure 3J:
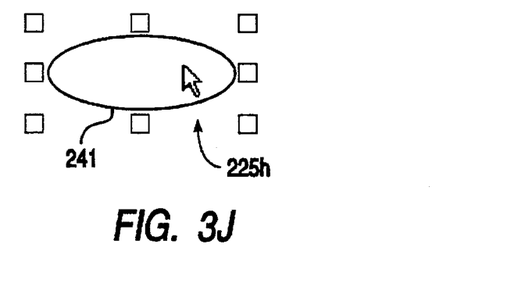

Merely selecting different cursor bitmaps, such as from cursors icons 230–239 (of FIG. 2B), does not solve the problem—the user is still required to know the valid pointing device operations beforehand. This is illustrated with particular reference to FIGS. 3F–J. In FIG. 3F, the screen object 241 (shown again in the client area 220 of window 200) has been selected (e.g., user has invoked a "selection" mode) as indicated by bounding boxes or handles, such as handle 243. In FIGS. 3G–J, the movement of the screen cursor 225 towards the screen object 241 is again illustrated. In FIG. 3G, the screen cursor 225 approaches the object 241 (as shown by the cursor 225e). In FIG. 3H, the screen cursor 225 is within a preselected minimum distance ("hit radius") of the handle 243. At this point, the screen cursor 225 is updated with the cursor bitmap 233 to indicate that a different mode of operation is available to the user, such as resizing the object 241. As shown in FIG. 3I, the screen cursor (now cursor 225g) will continue to display the cursor bitmap 233 while the cursor is within the hit radius of the handle 243. Once the screen cursor is outside of the hit radius of the handle 243, for example it is inside the object 241 as shown by the cursor 225h of FIG. 3J, the screen cursor reverts back to the default bitmap 230.

While the screen cursor is updated with a different bitmap (e.g., crosshairs of cursors 225f, 225g) during the foregoing operation, there is still no visual clue or indication to the user of which pointing device input operations (mouse button clicks), if any, are available at a given instance. In FIG. 3H, for example, the cursor 225f changes (e.g., into a crosshair) to indicate a different mode of operation, such as enlarging or shrinking the screen object 241. However, there is still no indication to the user of how such an operation would be achieved. Should the user perform a left mouse click or a "drag" to effect the currently available operation? Thus, even though a screen cursor may be updated with different bitmaps to indicate various modes of operation available to the user, such updates do not indicate the particular action which the user must undertake to accomplish the available operation.

INTELLIGENT SCREEN CURSOR

1. User Interface

Referring now to FIGS. 4–7, a user interface for the intelligent screen cursor of the present invention will be illustrated. In FIGS. 4A–E, the screen cursor operation of FIGS. 3A–E will again be illustrated, this time employing the intelligent screen cursor of the present invention. In FIG. 4A, screen object 241 is again illustrated in the client area 220 of window 200; in this example, however, the movement of an intelligent screen cursor 275 towards the object 241 (indicated by the dashed arrow) will be shown. As illustrated in FIGS. 4B–E, as the intelligent screen cursor 275 moves towards the object 241, valid input operations available to the user are shown directly by the screen cursor 275. In FIG. 4D, for example, a left mouse button of the screen cursor 275c is highlighted with a single caret 265 to indicate that a left mouse click may be entered by the user at this point in time. As shown in FIG. 4E, a double click of the left mouse button may be indicated by additional screen indicia, such as a double caret 266, displayed within the left button area of screen cursor 275d. In FIGS. 4B and 4C, however, the mouse button 265 of cursor 275 is not highlighted (i.e., it is displayed as blank or empty) as there are no valid pointing device input signals available (other than general movement of the pointing device).

Figure 4A:
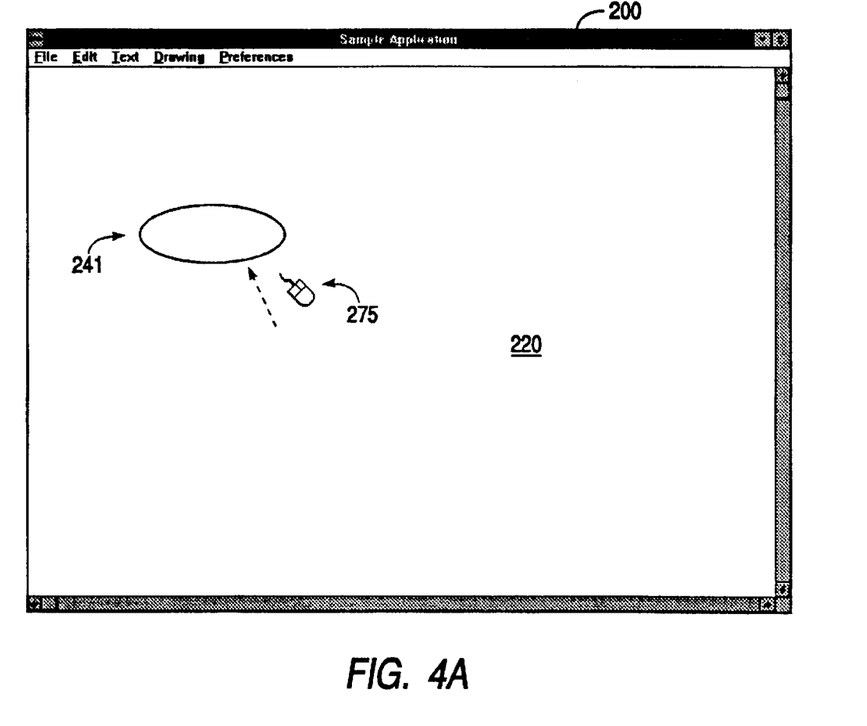
FIGS. 4A–E illustrate an intelligent screen cursor of the present invention, which allows the user to immediately determine valid options available for an input device.
Figure 4B:
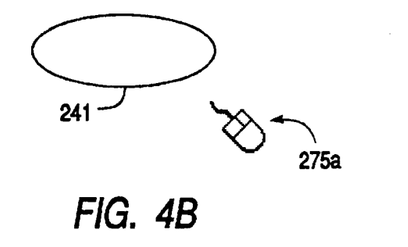
Figure 4C:
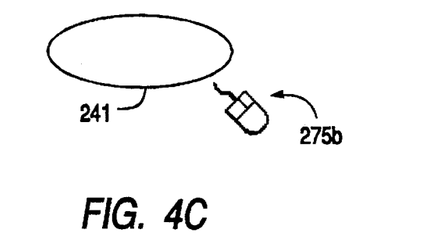
Figure 4D:
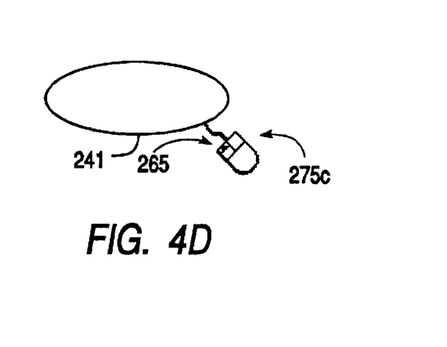
Figure 4E:
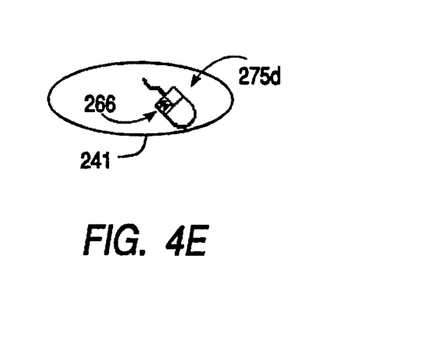
Figure 4F:
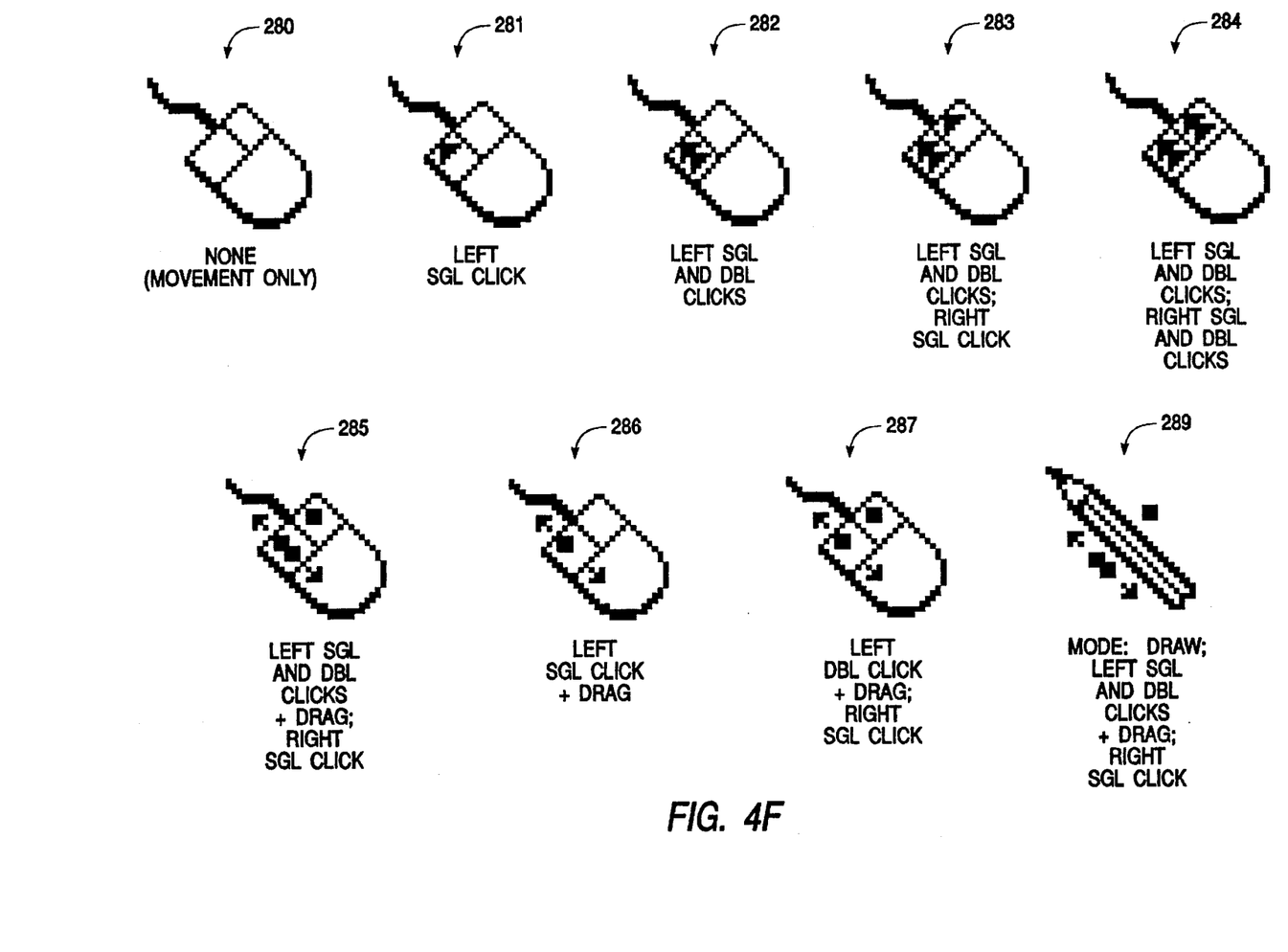
FIGS. 4F–G are a collection of icons for the intelligent screen cursor of the present invention, each of which serves to indicate valid options available for an input device; different modes (e.g., "drawing" mode) of operation may be indicated as well.

As shown in FIG. 4F, exemplary pointing device input may be indicated as follows. Bitmap 280 illustrates the system context when no pointing device input is valid (other than general movement of the pointing device). Bitmap 281 indicates a left single click. Bitmap 282, on the other hand, indicates a valid left single and double clicks. In this instance, a single click is assumed accompany a double click; alternatively, each signal may be shown separately, as described hereinbelow. Moreover, signals from different buttons may be indicated. In bitmap 283, for example, valid input includes a left single and double clicks and a right single click. In bitmap 284, on the other hand, valid input includes a left single and double clicks and a right single and double clicks.

As shown by bitmaps 285, 286, 287, a drag operation (e.g., continuous depressing of a mouse button coupled with movement) may be indicated as well, with appropriate user motion suggested by arrows or other visual clues. Moreover, the intelligent cursor of the present invention may also provide screen information indicating a particular mode of operation (e.g., "draw" mode). Bitmap 289, for example, illustrates the available mode of operation (e.g., "draw" mode) as well as the pointing device inputs (e.g., left single and double clicks with drag, and right single click) which are currently available.

Figure 4G:
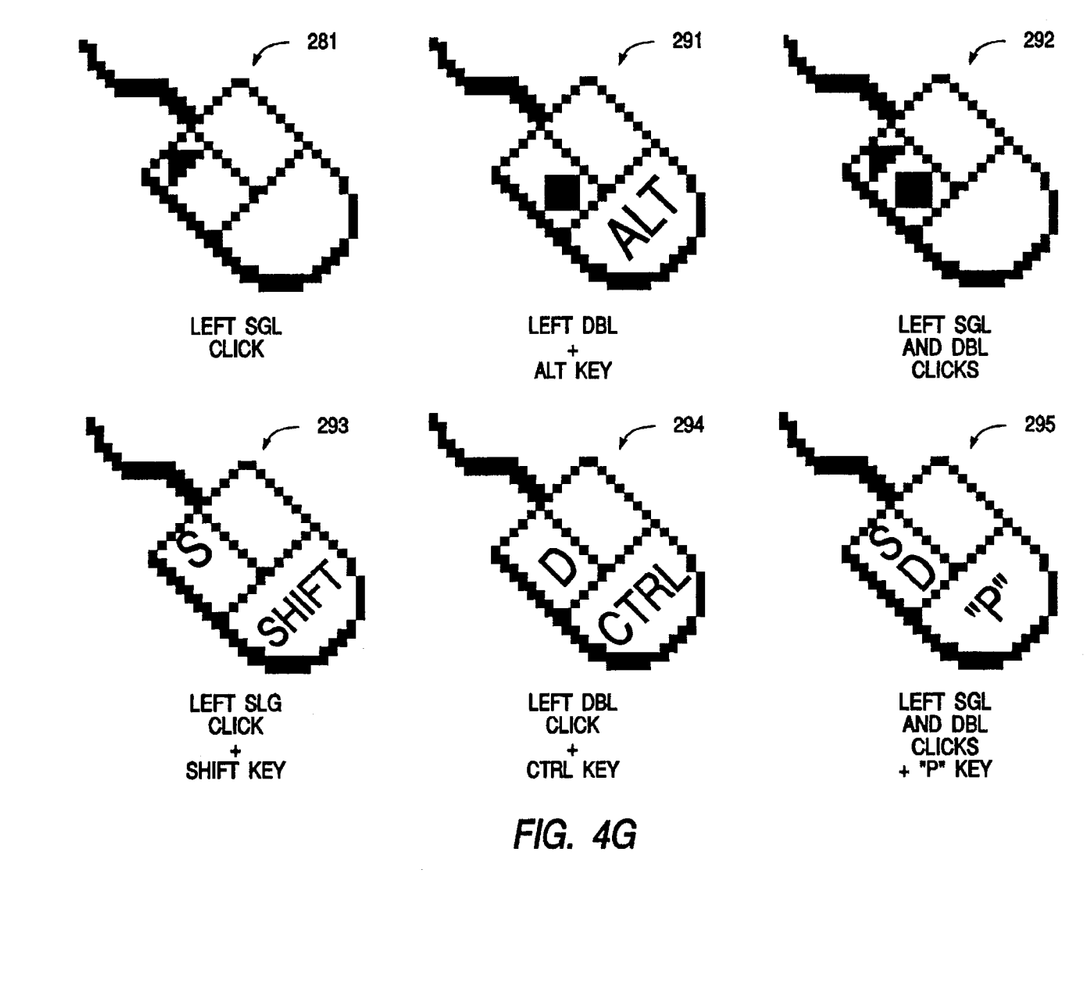

As illustrated in FIG. 4G, the intelligent screen cursor of the present invention may display other screen indicia, including additional graphic elements and/or alphanumeric information, to illustrate or convey available user inputs. Screen cursor bitmaps 291, 292, for example, include a diamond graphic object to indicate an available double click; unlike previously illustrated cursor bitmaps 282–284, single click capability is not assumed. As still yet another example, screen cursor bitmaps 291, 293, 294, and 295 include textual information indicating available clicks (e.g., "S" for single click; "D" for double click). In a similar manner, keyboard states (e.g., SHIFT, ALT, and CTRL) which are to accompany a mouse input may also be indicated.

Figure 5A:
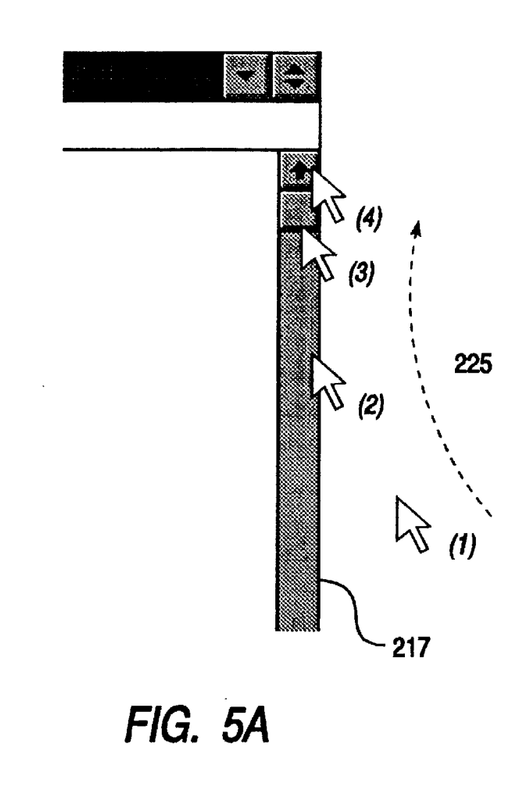
FIGS. 5A–B are partial bitmap screen shots illustrating the advantages of the intelligent screen cursor during interaction with a window scroll bar.
Figure 5B:
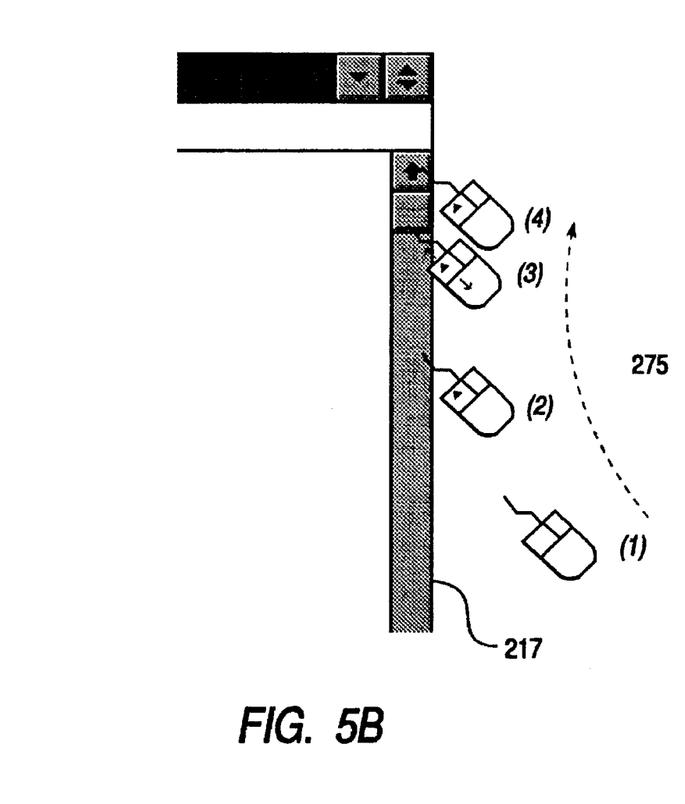

Referring now to FIGS. 5A–B, the advantages of the intelligent screen cursor of the present invention will be illustrated. Both figures illustrate the interaction between a screen cursor and the scroll bar 217 of window 200. In FIG. 5A, as the screen cursor 225 touches different components of the scroll bar 217, there is no indication or feedback to the user of what pointing device input(s), if any, are acceptable. In FIG. 5B, in contrast, the intelligent screen cursor 275 indicates the valid inputs of the pointing device at all times. At position (1), for example, the cursor 275 displays the bitmap 280, thus indicating only movement of the pointing device is available. At position (2), the cursor 275 is updated with the bitmap 281 to indicate that a left single click is a valid entry. At position (3), the cursor 275 is again updated, this time with the bitmap 286, thus indicating valid pointing device input includes left click and drag operations. Finally, at position (4), the cursor 275 reverts back to the bitmap 281 to indicate to the user that a left single click is the only currently valid pointing device input (other than movement).

Figure 6A:
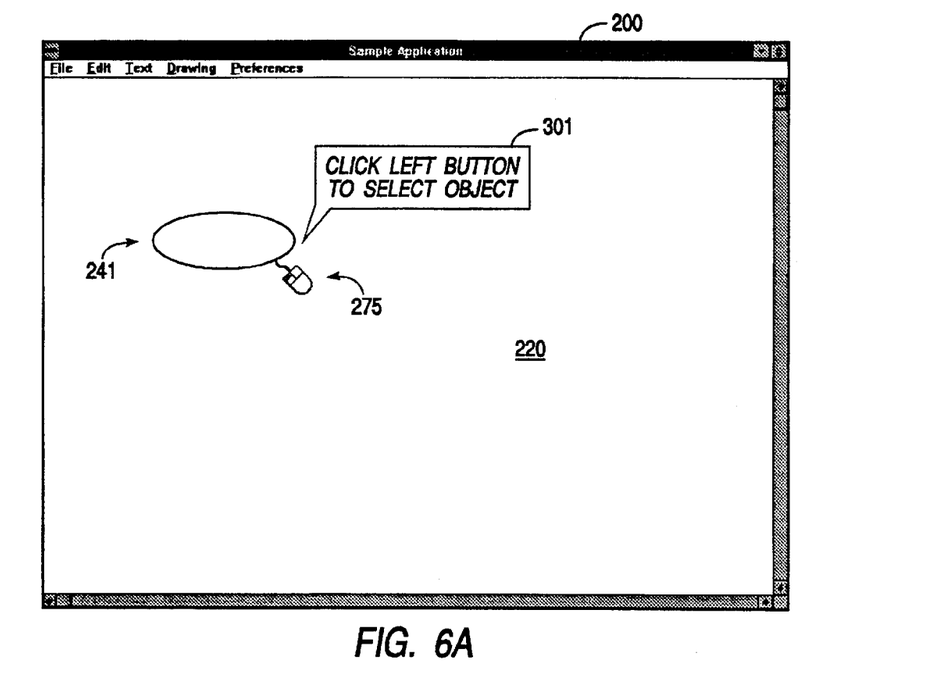
FIG. 6A is a bitmap screen shot illustrating an alternative embodiment of the present invention, where the intelligent screen cursor is augmented with textual screen information.
Figure 6B:
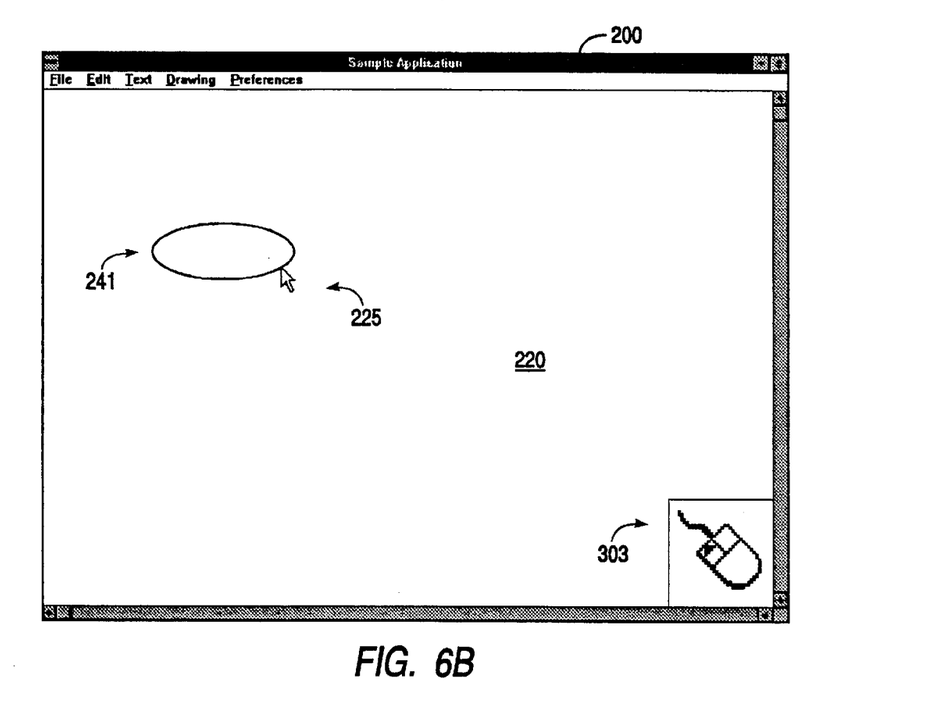
FIG. 6B is a bitmap screen shot illustrating a lesser preferred embodiment of the present invention, where user feedback is provided by graphic and/or textual information or other indicia displayed at a location remote from the actual screen cursor.

Referring now to FIGS. 6A–B, alternative embodiments of the intelligent screen cursor of the present invention will be illustrated. In FIG. 6A, (which corresponds to previous FIG. 4D), the intelligent screen cursor 275 may be accompanied by additional screen indicia, such as textual messages. Thus, as the cursor 275 touches the object 241, a screen message 301 is displayed to assist the user even further in understanding valid inputs and their consequences.

In a lesser preferred embodiment, shown in FIG. 6B, the intelligent screen cursor of the present invention may provide screen information at a region remote from the current cursor position (e.g., at a separate window). In this case, a window 303 containing a functional bitmap (such as those from FIG. 4F) is operationally coupled to the screen cursor 225. Therefore, the intelligent screen cursor of the present invention may also employ remote graphical indicia, such as feedback window 303, to indicate to the user which pointing device operations are valid. As still yet another embodiment, pointing device 105 itself may provide this information, for example, in the form of visual (e.g., LED or LCD) or tactile (e.g., vibrating) clues. The pointing device information itself may be provided in addition to or in lieu of the screen cursor.

2. Internal Operation

Figure 7:
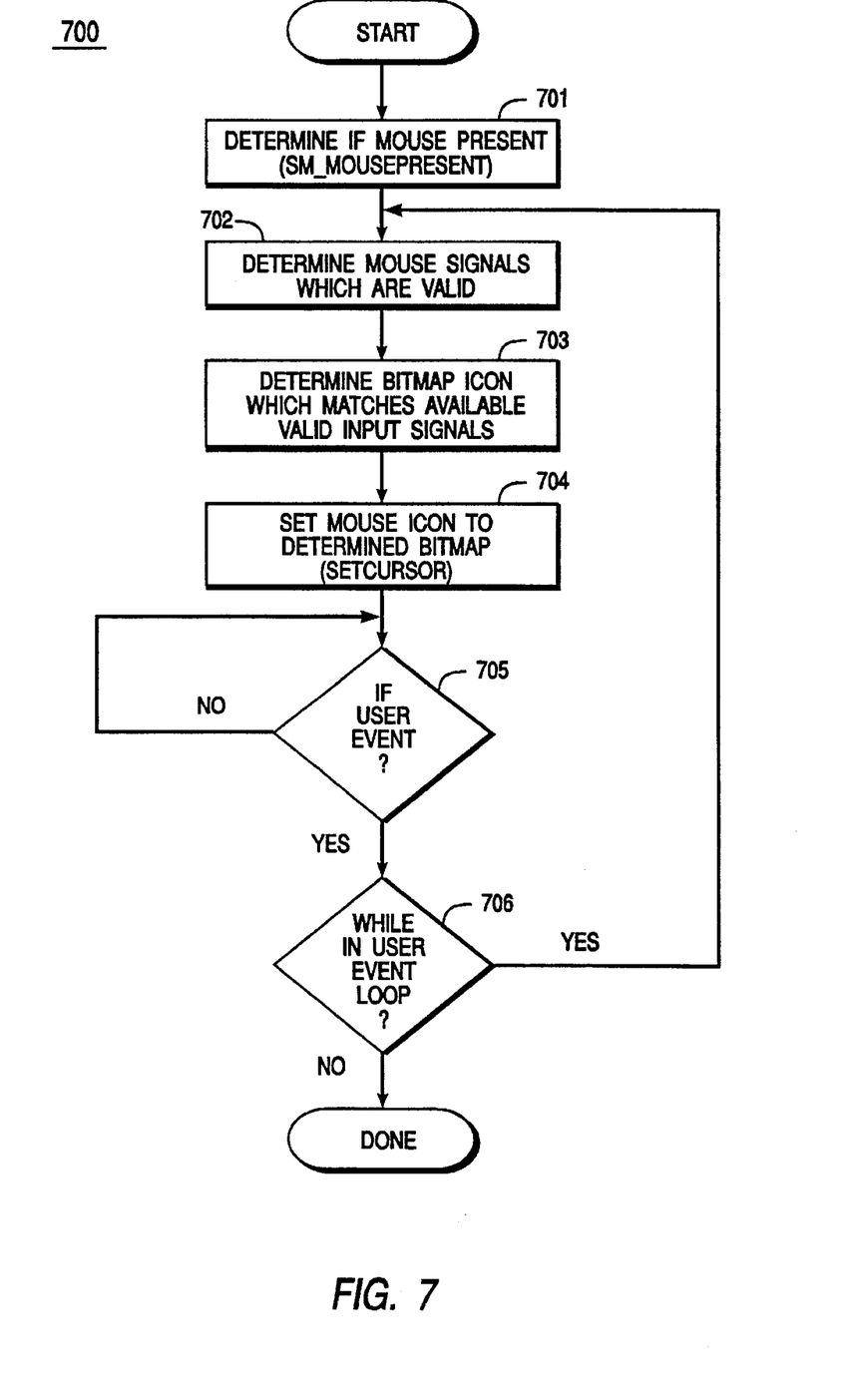
FIG. 7 is a flowchart of a method of the present invention for implementing an intelligent screen cursor.

Referring now to FIG. 7, the internal processes of the system 100 will now be described in detail. The operation of the intelligent cursor is performed by an event-driven method 700 which may be invoked by a message dispatcher in response to user events, including keyboard and mouse events. Moreover, the method determines user events (e.g., left button double-click) which are currently valid and reports them to the user.

By way of example, mouse events commonly occurring within a window's client area may be reported by the following messages:

| | |
|---|---|
| WM_LBUTTONDBLCLK | Left button double click |
| WM_LBUTTONDOWN | Left button down |
| WM_LBUTTONUP | Left button up |
| WM_MBUTTONDBLCLK | Middle button double-click |
| WM_MBUTTONDOWN | Middle button down |
| WM_MBUTTONUP | Middle button up |
| WM_MOUSEMOVE | Mouse Move |
| WM_RBUTTONDBLCLK | Right button double-click |
| WM_RBUTTONDOWN | Right button down |
| WM_RBUTTONUP | Right button up |

Similar messages for mouse events occurring in non-client areas are also available. Since the non-client area of a window is maintained by Windows, however, these latter messages are often safely ignored by a window object.

The dispatching of messages in an event-based system, such as Microsoft Windows, is known in the art; see e.g., Petzold, C., *Programming Windows*, Second Edition, Microsoft Press, 1990. Additional information can be found in Microsoft's Window Software Development Kit, including: 1) *Guide to Programming*, 2) *Reference*, Vols. 1 and 2, and 3) *Tools*, all available from Microsoft Corp. of Redmond, Wash. The disclosures of each of the foregoing are hereby incorporated by reference.

The individual steps of the method 700 are as follows. In step 701, the system determines if a pointing device, such as a mouse device, is present. This is a simple matter of querying Windows' system settings. In step 702, the system determines a context, including the current mouse cursor location and operation(s), currently available. In Windows, for example, a mouse pointer message, WM_NCHITEST, may be employed to query where a mouse cursor is positioned on a window. The query returns a "hit-test code" indicating the location. For example, a code of HTVSCROLL indicates that the cursor is positioned on the vertical scroll bar. HTCLIENT, on the other hand, indicates that the cursor is positioned within the client area. Moreover, a window object may include additional routines for testing whether the screen cursor is within a predefined hit radius for screen objects (e.g., employing Windows PtInRegion and PtInRect routines) and/or determining a current mode of operation (e.g., draw, edit, select, and the like) for the system.

From this information, the system may discern a set of input device signals which are valid. In step 703, a screen cursor bitmap correctly illustrating the pointing device signals available for input is determined. For example, if the current hit-test code is HTREDUCE (cursor is positioned at the window's minimize button), the left single click cursor bitmap 281 is chosen. In step 704, the screen cursor is updated with the bitmap determined to be appropriate (from step 703). The actual updating may be accomplished by employing Windows CreateCursor and SetCursor routines, which are fully described in the above-cited Windows SDK materials.

In step 705, a loop is established to wait for the next user event, such as moving the screen cursor. If a user event has occurred and the user has not terminated the event loop (yes at step 706), then the method loops back to step 702 for updating the screen cursor, as necessary. Upon termination of the session by the user (no at step 706), the method concludes.

While the invention is described in some detail with specific reference to a single preferred embodiment and certain alternatives, there is no intent to limit the invention to that particular embodiment or those specific alternatives. For example, the intelligent screen cursor of the present invention has been illustrated with mouse device bitmaps. Those skilled in the art, however, will appreciate that the intelligent screen cursor of the present invention may include bitmaps of other input devices, including trackballs, joysticks, light pens, and the like. Moreover, the present invention may be advantageously implemented in a variety of other UI platforms, including Macintosh, X-Windows, Motif, Next Step, and the like. Thus, the true scope of the present invention is not limited to any one of the foregoing exemplary embodiments but is instead defined by the following claims.

What is claimed is:

1. In a computer system, an improved method for providing feedback to a user, the method comprising:

displaying a user interface comprising a two-dimensional array of picture elements (pixels);

displaying on the user interface a cursor for indicating a position at a particular pixel on the user interface, said cursor moving on the user interface in response to movement of a pointing device by a user, said pointing device including at least two user-activated buttons, each which generates a first signal when single clicked by the user and generating a second signal when double clicked by the user; and as the pointing device is moved by the user, displaying feedback to the user for indicating all combinations of said signals which comprise valid input for each pixel pointed to by the cursor as it moves across the user interface.

* * * * *